May 31, 1938. J. MILLER 2,118,855
PACKING
Filed May 7, 1937
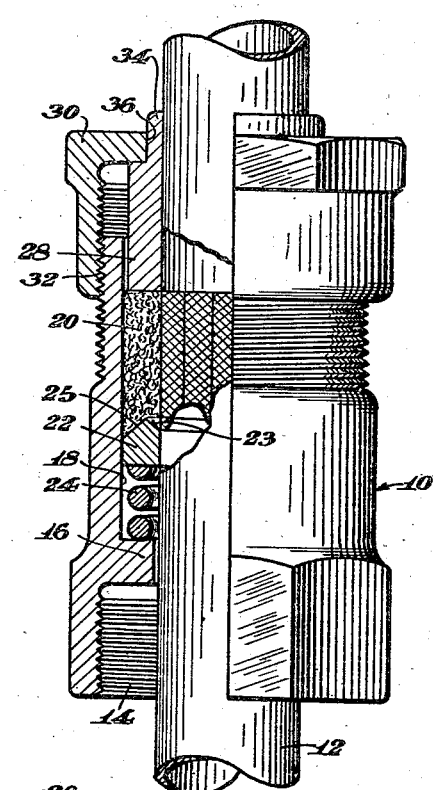
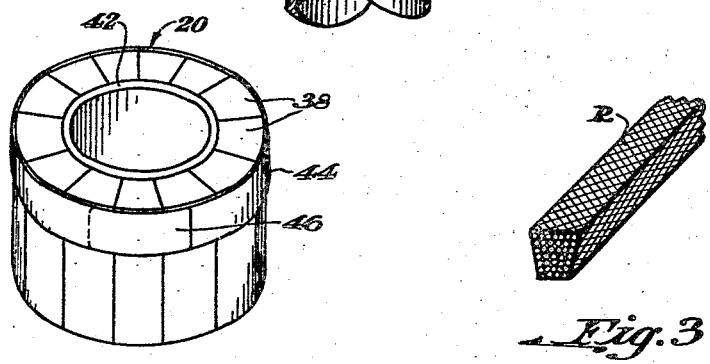
WITNESSES:
E. J. Maloney
A. H. Oldham
INVENTOR.
JOHN MILLER.
BY Brown, Critchlow & Flick
his ATTORNEYS.

Patented May 31, 1938

2,118,855

UNITED STATES PATENT OFFICE 2,118,855

PACKING

John Miller, Pittsburgh, Pa.

Application May 7, 1937, Serial No. 141,197

3 Claims. (Cl. 286—30)

This invention relates to packing for sealing between a housing and a relatively movable member, and to improved stuffing boxes.

Heretofore the provision of adequate sealing means between relatively movable members as, for example, a housing and a rotatable or reciprocating tube or shaft has long presented an obnoxious problem. While various types of packing, sealing means and stuffing boxes have been suggested and employed with greater or less degrees of success, frequent packing adjustment and replacement is ordinarily required and gas and liquid-tight joints are difficult to maintain.

It is the general object of my invention to provide an improved type of packing for effectively sealing between relatively movable members which packing needs little or no attention and is gas and liquid-tight over relatively long periods of use, and in which the packing means need be replaced only at infrequent intervals due to the normal slow wear thereof.

Another object of my invention is the provision of an improved packing which is particularly adapted to seal between a housing and a rotary or reciprocating shaft or tube of relatively small diameter and in which the packing functions without folds or overlapping and particularly without crowding of the packing material at the radially inner side of the packing with a stretching of the radially outer side of the packing.

Another object of my invention is the provision of an improved stuffing box having a novel type of packing and in which the over-all length of the stuffing box can be noticeably decreased while maintaining an adequate and improved type of bearing for the reciprocating and/or rotating member carried by the stuffing box.

The foregoing and other objects of my invention are achieved by the provision of a packing formed of a plurality of longitudinally extending lengths of braided rope packing having a sector shape in cross section and together forming a continuous packing ring wherein the ends of the cords of the braided packing lengths engage with the neck ring and packing gland of the stuffing box and which ends are particularly adapted to form feather or other positive sealing edges.

Further in accordance with my invention a stuffing box is provided comprising a housing, a member movable relative to the housing and received therein, a packing carried by the housing and surrounding the member, and a neck ring positioned in the housing and surrounding the member and having means resiliently urging it into engagement with the packing. Completing the combination is a metal packing gland positioned in the housing so as to surround the member and being in engagement with the other end of the packing, and a removable cap adjustably mounted on the housing and holding the packing gland against radial or longitudinal movement relative to the housing so that the packing gland forms a relatively long bearing support for the member rotatably and/or reciprocably mounted within the housing.

In the practice of my invention a packing is provided from a plurality of longitudinally extending relatively short lengths of substantially sector-shaped braided packing rope which are held in the form of a ring packing by circumferentially extending releasable means. In assembling the packing in a stuffing box the cap and packing gland of the stuffing box are removed and the circumferentially extending means holding the individual lengths of the packing together in ring shape are released at one point and the packing is handcuffed around the rotatable and/or reciprocable member received in the stuffing box. The end of the packing is inserted in the packing-receiving recess of the housing and thereafter the circumferentially extending means on the packing are ordinarily removed. The packing gland and cap are replaced and tightened in position in the usual manner.

In the accompanying drawing Fig. 1 is a side elevation partly broken away of a stuffing box constructed in accordance with the principles of my invention and illustrating the improved packing of my invention; Fig. 2 is a perspective view of a typical improved packing of my invention ready for sale or shipment; and Fig. 3 is a perspective view of a length of rope packing having a sector shape in cross-section.

While the principles of my invention are broadly applicable to the provision of means for sealing between relatively movable members of various kinds and characteristics, they are particularly beneficial in the construction of stuffing boxes for providing gas and/or liquid-tight joints between a housing and a reciprocating and/or rotary shaft received in the housing. Accordingly, my invention has been so illustrated in the accompanying drawing and this construction will now be described.

In the embodiment of my invention shown, the numeral 10 indicates a housing adapted to receive a hollow shaft or tube 12 which is adapted to have relatively rotary and/or reciprocating movement in the housing 10. The lower end of the housing 10 is attached to any desired means as by a female threaded flange 14 which terminates in a bearing portion 16 having close bearing engagement with the tube 12. The housing is formed with a circular recess 18 having walls in concentric relation with the tube 12. The recess 18 slidably receives a packing, indicated generally at 20, which is engaged by a neck ring 22 resiliently urged against the packing by any suitable means, such as a compression spring 24 which provides a relatively light but steady pressure on the neck ring 22 which is merely sufficient to hold the packing in operating relation. The end of the neck ring 22 engaging with the packing is in the form of a triangular rib as shown so that feather edges are formed on the packing as described in my copending application Serial No. 119,101, filed January 5, 1937. I have found that shaping the neck ring 22 with an inclined surface or area 23 and an inclined surface or area 25 of the proportions illustrated, and mounting the ring resiliently, as on the spring 24, provides a materially improved stuffing box. The area 23 is ordinarily formed about one-half the size of the area 25 and each area forms an angle of about 45° with the axis of the housing. Generally the angle between the areas is about 90°.

Received at the other end of the packing 20 in the recess 18 is a packing gland 28 which closely surrounds the tube 12 and which is adapted to be moved toward and from the packing 20 by a removable cap 30 adjustably secured to the housing 10 as by the provision of complementary threads 32. An important part of my inventive concept is the provision of cooperating means between the cap 30 and the packing gland 28 so that the gland is held in a fixed radial position during the operation of the stuffing box. This is achieved in the embodiment of my invention shown by forming the packing gland 28 with an axially extending circular flange 34 at one end which is received as shown in Fig. 1 in an opening 36 in the cap 30.

The packing 20 constructed in accordance with the principles of my invention comprises a plurality of longitudinally extending relatively short lengths 38 of braided rope packing of sector shape in cross-section. The packing is braided from continuous cords of a material suitable for the fluid, etc. to be handled and which are impregnated with a suitable lubricant so that the resulting rope is relatively soft and pliable and when cut presents the ends of the cords, as shown in Fig. 3. Heretofore, in using rope packing of round, square or other cross-sections, the rope was laid generally in a plurality of convolutions around the rotary or reciprocating member and stamped down progressively into the recess in the packing-receiving housing. I have found, however, where the diameter of the rotary or reciprocating member is relatively small, and even when it is several inches, that in employing rope packing as just described the radially inner portion of the packing is put under considerable compressive stress such as often causes folds, puckers and buckling of the packing, while the radially outer portion is put under tensional stresses tending to still further compress the radially inner portion of the packing.

Where, however, as shown in Fig. 2, rope packing is cut in a plurality of relatively short lengths 38 and these lengths are placed side by side so as to form a circular packing, the individual lengths conform without buckling at their radially inner surfaces, and have no tension at their radially outer surfaces. Moreover, the ends of the cords of each relatively short longitudinally extending length of packing rope are presented against the neck ring and packing gland of a stuffing box and these ends are readily adapted to form feather or flat sealing surfaces with the neck ring and even the packing gland and the side walls of the housing recess.

I preferably mount or assemble packing, constructed as just described, so that it can be readily handled or shipped and easily installed in a stuffing box. To this end in Fig. 2 I have illustrated the packing 20 as being formed around a supporting tube 42 which may be of any suitable material such as metal, cardboard, or wood, but which is ordinarily formed from cardboard. The individual lengths 38 of the packing 30 are held in proper relation to each other by circumferentially extending means, such as a relatively thin cloth or paper tape 44 positioned at one end thereof and adapted to stick to the individual packing lengths. The ends of the tape 44 are overlapped, as indicated at 46. I also contemplate stringing the individual lengths 38 together on circumferentially extending wires or cords which may pierce the lengths or extend on the radially inner or outer surfaces thereof.

When the packing is placed in the stuffing box, as, for example, in the housing 10, the cap 30 and packing gland 28 are taken from the housing 10, the tube 42 is removed from the packing and the packing is inserted in the recess 18 in the housing 10. This is readily accomplished by releasing the overlapping ends of the tape 44, and with the individual lengths 38 of the packing being held by the tape the packing is placed around the tube 12 by a handcuff-like opening and closing movement of the packing. In this operation the untaped end of the packing is toward the recess 18 and due to the upper end of the packing being held tightly around the tube 12 by the tape 44 the lower end of the packing slips easily down into the recess 18. With the lower end of the packing 20 held in the recess 18 the tape 44 is completely removed and by using the gland the packing is pushed down into the recess into engagement with the neck ring 22. The cap 30 is now screwed back into place until the packing 20 is held firmly between the packing gland and the neck ring as will be understood.

It is believed that the operation of my improved packing and stuffing box will be evident from the foregoing description. The individual longitudinally extending lengths of the packing are in effective sealing relation without being compressed at their radially inner portions or under tension at their radially outer portions. The cord ends of the packing are in engagement with the neck ring 22 and are readily formed into feather edges when the cap 30 is tightened into position. The packing gland 28 being held in radially and longitudinally fixed relation with the cap 30 provides a relatively long bearing support for the tube 12 without necessitating a separate bearing surface such as heretofore provided which I have found unduly increases the length of the stuffing box. The wear on the packing is relatively slow and a gas and liquid-tight joint is provided over long periods of use with little or no attention due to the take-up of any normal wear by the spring 24. When the packing does finally wear out it can be readily replaced by a new packing as heretofore described.

While in accordance with the patent statutes one embodiment of my invention has been illustrated and described in detail, it should be understood that the invention is not limited thereto or thereby but is defined in the appended claims.

I claim:

1. A stuffing box comprising a housing, a member movable relative to the housing received within the housing, a packing carried by the housing and surrounding the member, a neck ring positioned in the housing and surrounding the member, a circumferentially extending rib of triangular cross-section on the neck ring, and means resiliently urging the rib of the neck ring into engagement with the packing so as to form feather edges in engagement with the member and the housing, said packing being formed of a plurality of longitudinally extending relatively short lengths of relatively soft, loosely braided rope packing of sector shape in cross-section and together forming a packing ring having the ends of the cords of the braided packing engaging with the neck ring, said packing being impregnated with a suitable lubricant.

2. A stuffing box comprising a housing, a member movable relative to the housing received within the housing, and a packing carried by the housing and surrounding the member, said packing being formed of a plurality of longitudinally extending relatively short lengths of relatively soft, loosely braided rope packing, each length being substantially of sector shape in cross-section and together forming a packing ring having the ends of the cords of the braided packing exposed at the ends of the packing, and adapted to form sealing edges with the housing and member, said packing being impregnated with a suitable lubricant.

3. The combination of a stuffing box housing, a member received within the housing, said housing and member adapted to have relative movement, a packing between the housing and the member and received in the housing, said packing comprising a plurality of lengths of lubricant-impregnated, soft rope packing extending longitudinally of the housing and circumferentially side by side, a neck ring having a circumferentially extending substantially triangular rib in engagement with the packing so that feather edges are formed thereon in contact with the member and housing, and means resiliently urging the neck ring into contact with the packing.

JOHN MILLER.